(12) United States Patent
Shen et al.

(10) Patent No.: US 9,769,760 B2
(45) Date of Patent: Sep. 19, 2017

(54) METHOD AND APPARATUS FOR POWER SAVING SCHEME IN A LOCATION SENSOR

(71) Applicant: Nokia Technologies Oy, Espoo (FI)

(72) Inventors: Hongrui Shen, Beijing (CN); Peng Lan, Beijing (CN); Jing Wu, Beijing (CN); Naichen Cui, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/651,729

(22) PCT Filed: Feb. 5, 2013

(86) PCT No.: PCT/CN2013/071367
§ 371 (c)(1),
(2) Date: Jun. 12, 2015

(87) PCT Pub. No.: WO2014/121431
PCT Pub. Date: Aug. 14, 2014

(65) Prior Publication Data
US 2015/0312863 A1    Oct. 29, 2015

(51) Int. Cl.
*H04B 1/38* (2015.01)
*H04W 52/02* (2009.01)
(Continued)

(52) U.S. Cl.
CPC ........ *H04W 52/0274* (2013.01); *G01C 21/26* (2013.01); *G01C 21/3697* (2013.01);
(Continued)

(58) Field of Classification Search
USPC .................... 455/574; 342/357; 701/420, 99; 340/539.13
See application file for complete search history.

(56) References Cited

U.S. PATENT DOCUMENTS 8,228,234 B2 * 7/2012 Paulson ................. G01C 21/26
                                                         342/357.74
9,581,463 B2 * 2/2017 Nallu ................. G06Q 30/0633
(Continued)

FOREIGN PATENT DOCUMENTS

CN         1979212 A       6/2007
CN       101315422 A      12/2008
(Continued)

OTHER PUBLICATIONS

International Search Report and Written Opinion received for corresponding Patent Cooperation Treaty Application No. PCT/CN2013/071367 dated Nov. 14, 2013, 9 pages.
(Continued)

*Primary Examiner* — David Q Nguyen
(74) *Attorney, Agent, or Firm* — Mintz Levin Cohn Ferris Glovsky and Popeo, P.C.

(57) ABSTRACT

An approach is provided for providing efficient power saving schemes for a device and any associated sensors thereon while allowing for various levels of functionalities. A device determines a distance from a location of a device on a route to a checkpoint location on the route based, at least in part, on mapping data associated with the route. Then the device causes an initiation of a sleep mode of operation for at least one location sensor associated with the device. Further, the device causes an initiation of an active mode of operation for the at least one location sensor based, at least one in part, on a determination that the device has substantially traveled the distance, a portion of the distance, or a combination thereof.

23 Claims, 11 Drawing Sheets

(51) Int. Cl.
*G01S 19/34* (2010.01)
*G01C 21/26* (2006.01)
*G01C 21/36* (2006.01)
*G06F 1/32* (2006.01)

(52) U.S. Cl.
CPC ............ *G01S 19/34* (2013.01); *G06F 1/325* (2013.01); *G06F 1/3206* (2013.01); *Y02B 60/50* (2013.01)

(56) References Cited

U.S. PATENT DOCUMENTS

| | | | | |
|---|---|---|---|---|
| 2004/0113772 | A1* | 6/2004 | Hong Chou | ........... G08G 1/202 340/539.13 |
| 2009/0098880 | A1 | 4/2009 | Lindquist | |
| 2011/0250871 | A1 | 10/2011 | Huang et al. | |
| 2012/0303266 | A1* | 11/2012 | Su | ...................... G01C 21/3476 701/420 |
| 2013/0080280 | A1* | 3/2013 | Scipioni | ................. G06Q 10/06 705/26.1 |
| 2013/0304348 | A1* | 11/2013 | Davidson | ............. G06Q 10/083 701/99 |
| 2015/0106011 | A1* | 4/2015 | Nesbitt | ............... G01C 21/3476 701/412 |

FOREIGN PATENT DOCUMENTS

| | | |
|---|---|---|
| CN | 101470182 A | 7/2009 |
| EP | 2102593 A1 | 9/2009 |

OTHER PUBLICATIONS

European Search Report (Supplementary) PCT/CN2013071367, issued Sep. 12, 2016. (6 Pages).

* cited by examiner

METHOD AND APPARATUS FOR POWER SAVING SCHEME IN A LOCATION SENSOR

This application was originally filed as Patent Cooperation Treaty Application No. PCT/CN2013/071367 filed Feb. 5, 2013.

BACKGROUND

Service providers (e.g., wireless, cellular, etc.) and device manufacturers are continually challenged to deliver value and convenience to consumers by, for example, providing compelling network services. One area of development has been proliferation of various sensors; for example, location, magnetometer, accelerometer, speedometer, personal, and the like sensors, that are included in various devices (e.g., mobile phones, tablets, automobiles, computers, etc.), which provide a wide range of services to users. For instance, a location sensor (e.g., a global positioning system (GPS) receiver) may be used for navigation purposes while a user is walking, driving, boating, biking, hiking, etc., or a magnetometer may be used to indicate direction of user or device movement, or an accelerometer in a mobile device may be used to interface with and play certain electronic games, and the like. However, as users increase use of their devices and the associated sensors, power requirements at the devices and at the sensors may limit duration of and/or functionalities of the devices for the users. Accordingly, service providers and device manufacturers face significant challenges to providing efficient power saving schemes for a device its sensors.

Some Example Embodiments

Therefore, there is a need for providing efficient power saving schemes for a device and any associated sensors thereon while allowing for various levels of functionalities.

According to one embodiment, a method comprises determining a distance from a location of a device on a route to a checkpoint location on the route based, at least in part, on mapping data associated with the route. The method also comprises causing, at least in part, an initiation of a sleep mode of operation for at least one location sensor associated with the device. The method further comprises causing, at least in part, an initiation of an active mode of operation for the at least one location sensor based, at least one in part, on a determination that the device has substantially traveled the distance, a portion of the distance, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine a distance from a location of a device on a route to a checkpoint location on the route based, at least in part, on mapping data associated with the route. The apparatus is also caused to cause, at least in part, an initiation of a sleep mode of operation for at least one location sensor associated with the device. The apparatus is further caused to cause, at least in part, an initiation of an active mode of operation for the at least one location sensor based, at least one in part, on a determination that the device has substantially traveled the distance, a portion of the distance, or a combination thereof.

According to another embodiment, a computer-readable storage medium carrying one or more sequences of one or more instructions which, when executed by one or more processors, cause, at least in part, an apparatus to determine a distance from a location of a device on a route to a checkpoint location on the route based, at least in part, on mapping data associated with the route. The apparatus is also caused to cause, at least in part, an initiation of a sleep mode of operation for at least one location sensor associated with the device. The apparatus is further caused to cause, at least in part, an initiation of an active mode of operation for the at least one location sensor based, at least one in part, on a determination that the device has substantially traveled the distance, a portion of the distance, or a combination thereof.

According to another embodiment, an apparatus comprises means determining a distance from a location of a device on a route to a checkpoint location on the route based, at least in part, on mapping data associated with the route. The apparatus also comprises means for causing, at least in part, an initiation of a sleep mode of operation for at least one location sensor associated with the device. The apparatus further comprises means for causing, at least in part, an initiation of an active mode of operation for the at least one location sensor based, at least one in part, on a determination that the device has substantially traveled the distance, a portion of the distance, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing efficient power saving schemes for a device and any associated sensors thereon while allowing for various levels of functionalities. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term a "host device," and a "host" can refer to a device which may include a navigation module and/or a navigation device. For example, various mobile devices such as a mobile phone, a tablet, a laptop, and the like may include a navigation device which may include a navigation module. In another example, an in-vehicle electronics system in/on a vehicle (e.g., a car, a boat, a plane, a motorbike, etc.) may include a navigation device and/or a navigation module. In various embodiments, a host device may provide one or more functionalities to one or more devices which may be implemented in and/or via the host device.

It is noted that embodiments of the approach described herein are applicable to any type of sensor and/or instruments, which may include digital and/or analog instrument panels, environmental sensors, sensors for physical properties, location sensors, personal sensors, wireless sensors, wired sensors, virtual sensors, network sensors, and the like.

Figure 1:
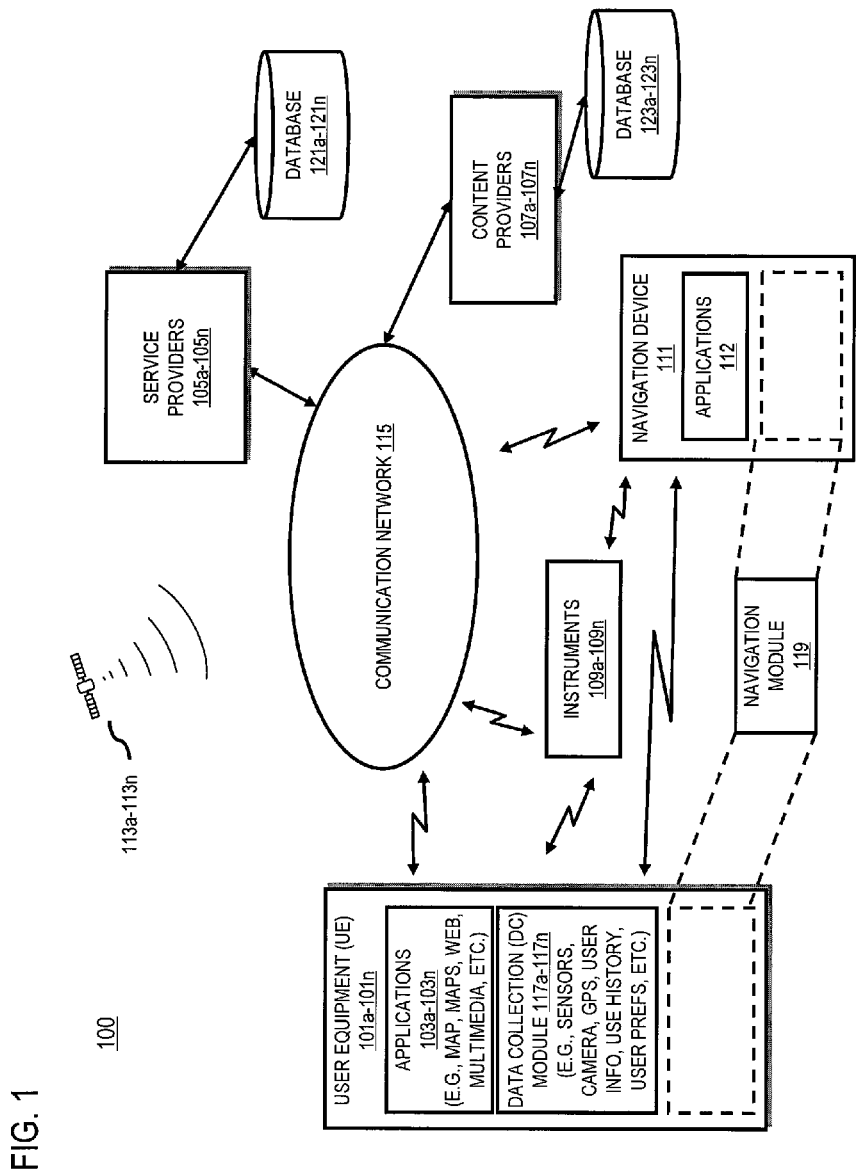
FIG. 1 is a diagram of a system capable of providing efficient power saving schemes for a device and any associated sensors thereon while allowing for various levels of functionalities, according to an embodiment.

FIG. 1 is a diagram of a system capable of providing efficient power saving schemes for a device and any associated sensors thereon while allowing for various levels of functionalities, according to an embodiment. As discussed above, with proliferation of available sensors (e.g., location sensors, thermometers, health and wellness sensors, wireless communication sensors, etc.) on electronic devices, individuals utilize a range of these devices (e.g., smartphones, tablets, navigation devices, laptops, etc.), which may include various applications, firmware, software, etc., for various tasks and purposes. Further, these devices may be utilized in various settings and places, for example, at home, at the office, in/on a vehicle (e.g., a car, a boat, a plane, a bike, etc.), and the like. However, as the devices have become more powerful and feature rich, they also utilize more power to provide the functionalilties the users have become accustomed to. In many instances the devices are powered by batteries, have limited power supply, and/or the user may wish for the device to operate as efficiently as possible in order to minimize power usage while the devices still provide certain levels of functionality. In one scenario, a device may be utilized in/on a vehicle where the power source may be limited and/or the user may wish to conserve energy. For example, the device may use power from the vehicle's battery, which may cause utilization of additional resources in the vehicle (e.g., additional fuel, charging equipment, etc.) to recharge the vehicle's battery. In one example, the vehicle itself may be an electric vehicle (e.g., an electric car, an electric motorbike, an electric boat, etc.), which may rely on limited resources (e.g., batteries, fuel, etc.) to power the vehicle, devices, systems, instruments, and the like utilizing the vehicle's power sources. Therefore, there is a need to provide efficient power saving schemes for a device and any associated sensors thereon while allowing for various levels of functionalities.

To address, at least these problems, a system 100 of FIG. 1 presents the capability for providing efficient power saving schemes for a device and any associated sensors. More specifically, the system 100 of FIG. 1 introduces the capability of varying functionalities of certain sensors and devices in the system for achieving power savings while the device are still capable of providing certain levels of functionalities. In one instance, a user may utilize device a device, which may include one or more location sensors, for positioning and navigation purposes, wherein the location sensors may be in communication with a satellite-based positioning system (e.g., GPS, Global Navigation Satellite System (GLONASS)), a network-assisted positioning system, and the like. In various embodiments, the system 100 may vary operation modes of various devices and sensors by enabling and/or disabling certain features and functions of the devices and/or the sensors. For example, it is possible that not all sensors of a device need to be functioning continuously and/or at the same time in order for the device to be able to provide a requested functionality to a user. In one embodiment, for power savings, one or more of the one or more location sensors may be put into a low power mode, a sleep mode, a suspended mode, and the like, wherein positioning and/or navigation functionalities may still be provided. In one use case scenario, a user may be utilizing a navigation system in a vehicle where the navigation system has acquired a current location and navigation information from a satellite-based positioning system and/or a network-assisted positioning system, and has determined a navigation route (route), which may be presented via one or more user interface mechanisms on one or more user devices. Further, the navigation system may determine various navigation information (e.g., from a mapping data) associated with the route, for example, distance from a current location to a destination, to a checkpoint, to a point of interest (POI), to a navigation event, and the like. Furthermore, the navigation information may include traffic information, available alternate routes, road conditions, cross roads, possible exits, and the like. In one use case scenario, once the current route information is retrieved and/or determined from one or more external sources (e.g., GPS, a service provider, etc.), additional information, calculations, determinations, etc. may be performed by one or more local devices.

In one embodiment, a navigation device in a vehicle and/or on a user device (e.g., a mobile device) may have determined a current location of the vehicle/device and may further determine one or more movement information items associated with the vehicle for presenting a change location to the user. In one embodiment, the navigation device may determine a distance on a route, over which distance, the navigation device may locally determine movement information of the navigation device (e.g., in/on a vehicle) and present location information (e.g., utilizing mapping data) before accessing/requesting external location information (e.g., GPS location), wherein location sensors of the navigation device may be put in a sleep mode of operation for power savings and/or efficiency. In various embodiments, the navigation device may utilize various information items available from various sensors/instruments/gauges for determining a movement, a direction, a speed, and the like. For example, the information items may be available from an odometer, a speedometer, a compass, a gyroscope, a pedometer, and the like. In one embodiment, the navigation device may be integrated with a vehicle's onboard instrumentation system. In one embodiment, the navigation device may be integrated into a user device, for example, a mobile phone, a tablet, a laptop, and the like, wherein the user device may communicate with a vehicle's onboard instrumentation system, for example, via one or more wireless and/or wired communication channels. In one embodiment, the navigation device may be a device dedicated for navigation services, wherein it may communicate with the vehicle's onboard instrumentation system, one or more other user devices, and the like, for example, via one or more wireless and/or wired communication channels.

In one embodiment, a navigation device may utilize the methods of the system 100 even when a user is not actively using/accessing the navigation device. For example, in some vehicles, once a vehicle is being utilized for travelling, an available navigation device begins presenting location and navigation information on a UI display, wherein the location sensors may be continuously communicating with external location positioning sources and services. In a scenario where a user does not necessarily need the positioning information (e.g., driving to a known destination, driving a local neighborhood), an available navigation device may initiate a sleep mode of operation for one or more location sensors used for communicating with external sources and services and instead utilize local map data and vehicle travel/movement data to determine and present the current vehicle location. In one embodiment, the navigation device may activate the location sensors at predefined intervals to obtain real-time positioning data from external sources and services for more accurate updates of vehicle location information.

As shown in FIG. 1, in one embodiment, the system 100 includes user equipment (UE) 101*a*-101*n* (also collectively referred to as a UE 101 and/or UEs 101), which may be utilized to execute one or more applications 103*a*-103*n* (also collectively referred to as applications 103) including navigation application, games, social networking, web browser, media application, user interface (UI), map application, web client, etc. to communicate with other UEs 101, one or more service providers 105*a*-105*n* (also collectively referred to as service provider 105), one or more content providers 107*a*-107*n* (also collectively referred to as content providers 107), one or more instruments/gauges 109*a*-109*n* (also collectively referred to as the instruments 109), a navigation device 111, one or more satellites 113*a*-113*n* (also collectively referred to as the satellite system 113), and/or with other components of a communication network 115 directly and/or over the communication network 115. In one embodiment, the UEs 101 may include data collection modules 117*a*-117*n* (also collectively referred to as DC module 117) for determining and/or collecting data associated with the UEs 101, one or more sensors of the UE 101, one or more users of the UEs 101, applications 103, one or more content items, and the like.

In one embodiment, a UE 101 may include a navigation module 119, which may include one or more sensors and/or modules for determining, requesting, and/or accessing one or more navigation information items for providing location and navigation services, wherein the navigation information may include mapping data, movement direction, geo-location, and the like. In addition, the UE 101 can execute an application 103 that is a software client for storing, processing, and/or forwarding the navigation information to other components of the system 100. In one embodiment, the navigation module 119 may be implemented in a navigation device 111, wherein the navigation device 111 may communicate with any entity of the system 100 either directly and/or via the communication network 115. In one embodiment, the navigation device 111 may communicate with the instruments 109 for requesting one or more navigation information items available from the instruments 109. In one embodiment, the instruments 109 may be associated with a vehicle (e.g., a car, a bike, a motorcycle, a boat, etc.) In one embodiment, the navigation device 111 and/or the navigation module 119 may be implemented as one or more components of a vehicle's electronics system. In various embodiments, the navigation module may be implemented in various host devices (host), wherein a host may provide one or more functionalities to implement the navigation module 119. In one embodiment, the navigation device 111 may include one or more applications 112, for example, including navigation application, games, social networking, web browser, media application, user interface (UI), map application, web client, etc. to communicate with the UEs 101, the service providers 105, the content providers 107, the instruments 109, one or more other navigation devices, the satellite system 113, and/or with other components of a communication network 115 directly and/or over the communication network 115.

In one embodiment, the service providers 105 may include and/or have access to one or more databases 121a-121n (also collectively referred to as database 121), which may include various mapping data, user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, navigation services, location based services, online shopping, social networking services (e.g., blogging), content sharing, media upload, media download, media streaming, account management services, or a combination thereof. Further, the service providers 105 may conduct a search for content items, media items, information, coupons, and the like associated with one or more users, POIs, geo-locations, and the like.

In one embodiment, the content providers 107 may include and/or have access to one or more database 123a-123n (also collectively referred to as database 123), which may store, include, and/or have access to various content items. For example, the content providers 107 may store content items (e.g., at the database 123) provided by various users, various service providers, crowd-sourced content, and the like. Further, the service providers 105 and/or the content providers 107 may utilize one or more service application programming interfaces (APIs)/integrated interface, through which communication, media, content, and information (e.g., associated with users, applications, services, content, etc.) may be shared, accessed and/or processed.

In various embodiments, the UEs 101 may interact with the instruments 109, wherein the UEs 101 and/or the instruments 109 may include a combination of various sensors, for example, one or more wearable sensors, accelerometers, odometer sensors, speedometer sensors, magnetometer sensors, vehicle diagnostic sensors, vehicle information sensors, and the like. By way of example, connectivity between the UEs 101, the navigation device 111, and/or the instruments 109 may be facilitated by short range wireless communications (e.g., Bluetooth®, WLAN, ANT/ANT+, ZigBee, etc.) and/or via a wired communication bus/hub.

In one embodiment, the navigation module may include one or more sensors (e.g., a microphone, a camera, an accelerometer, GPS receiver, a magnetometer, etc.) for monitoring and/or collection of sensor data. For example, the sensors may capture odometer, accelerometer, speedometer, magnetometer, and the like information at periodic intervals. The UEs 101 (e.g., via the application 103), the DC module 117, and/or the navigation module 119) may store the data temporarily, perform any needed processing and/or aggregation, and send the data to the service providers 105 continuously and/or at periodic intervals. In one embodiment, the data sent includes, at least in part, timestamps, sensor data (e.g., vehicle data, environmental data, etc.), and/or context information. By way of example, the operational states of the sensors on the UEs 101 and/or the navigation device 111 may include setting and/or modifying of related operational parameters including sampling rate, parameters to sample, transmission protocol, activity timing, etc. By way of example, the UEs 101 and/or the navigation device 111 may include one or more components for providing adaptive filtering of sensors and/or sensor data, for example, by executing at least one algorithm.

In one embodiment, the system 100 may determining a distance from a location of a device on a route to a checkpoint location on the route based, at least in part, on mapping data associated with the route. In one use case scenario, a user may indicate, via a navigation device (e.g., a UE 101, the navigation device 111, etc.), on a map application a desired destination location, wherein the navigation module 119 may determine one or more possible routes to the destination based on mapping data. In one embodiment, the mapping data is available on the device, via one or more service providers, via one or more content providers, or a combination thereof. Further, once the user and/or the navigation module 119 select a route, the navigation module 119 may determine various information available for the selected route. For example, a distance from the user's current location to the destination may be determined, a travel time, or a distance from the user's current location to one or more checkpoint locations along the route may be determined, or one or more distances between the one or more checkpoint locations may be determined, and the like. In one embodiment, a checkpoint location may be a point along the route where the user may be able to take one or more actions, for example, take an exit off a freeway, or make a right/left turn onto another road, or make a U-turn, and the like. In one embodiment, there may be one or more sub-destinations identified by the user, wherein a sub-destination may be planned stop for the user. For example, a stop at a market location when traveling from a workplace to home.

In one embodiment, the system 100 may cause, at least in part, an initiation of a sleep mode of operation for at least one location sensor associated with the device. In one embodiment, the location sensor includes, at least in part, a satellite-based navigation system, a network-assisted navigation system, or a combination thereof. For example, the location sensors may include one or more transceivers for communication with one or more satellite-based positioning systems (e.g., GPS, GLONASS, etc.), one or more network-assisted positioning systems, and the like. In various embodiments, the navigation module 119 and/or a host device of the navigation module 119 may determine that it is possible and/or beneficial to put into a sleep mode of operation one or more sensors associated with the navigation module 119 and/or the host device while still capable of providing one or more desired functionalities (e.g., navigation). In various embodiments, the initiation of the sleep mode of operation is based, at least in part, on a power level associated with the device, a configuration of the device, etc., wherein the sleep mode of operation may be for an improved energy efficiency and power savings. In one embodiment, the initiation of the sleep mode of operation is based, at least in part, on a determination that the distance is greater than a predetermined threshold value, wherein the threshold value may be a determined minimum distance before reaching a next checkpoint location, for example, two miles before reaching the next checkpoint location.

In one embodiment, the system 100 may cause, at least in part, an initiation of an active mode of operation for the at least one location sensor based, at least one in part, on a determination that the device has substantially traveled the distance, a portion of the distance, or a combination thereof.

In one embodiment, the navigation module 119 may compare a determined traveled distance to a predetermined threshold value for determining whether to initiate active mode of operation for one or more sensors associated with the navigation module 119 and/or a host device. In one embodiment, the traveled distance may be presented on a map application via a UI on a device, wherein the traveled distance may be continuously determined and presented. In one embodiment, the navigation module 119 may utilize, at least in part, odometer data, e.g., of a vehicle, in determining that the device (e.g., the vehicle) has substantially traveled the distance and/or a portion of the distance from a starting point location and/or a prior checkpoint location to a next checkpoint location or a final destination location. For example, the odometer data may be obtained via a wireless and/or a wired interface with an odometer sensor and/or an odometer instrument associated with the vehicle. In one embodiment, the determination that the device has substantially traveled the distance, a portion of the distance, or a combination thereof is based, at least in part, on speedometer data and a duration of travel. For example, a given speed of a vehicle for a given travel duration may be utilized to determine a traveled distance during the given travel duration. For example, the speedometer data may be obtained via a wireless and/or a wired interface with a speedometer sensor and/or a speedometer instrument associated with the vehicle. In one embodiment, a current speed of a vehicle may be utilized to estimate if a distance threshold value may need to be reconsidered/recalculated so that there is sufficient time for activating the one or more sensors which may be in a sleep mode of operation. In one instance, activation of the one or more sensors may require a certain amount of time, for example one minute, wherein the threshold value for activating the one or more sensors is set at a distance of one mile before a checkpoint location. However, if a vehicle is traveling at a high rate of speed, for example more than 60 mph (e.g., more than one mile-per-min), then the vehicle will reach and pass the threshold value, which may reduce the time available to activate the one or more sensors for requesting and acquiring real-time location information from an external source. In one embodiment, one or more sensors may be activated before reaching a threshold value if it is determined that a device (e.g., a vehicle) may reach the threshold value before the one or more sensors are activated.

In one embodiment, the system 100 may determine whether to enable the sleep mode of operation based, at least in part, on a user input. In one embodiment, a UE 101 and/or a navigation device 111 may present a UI (e.g., display, audio, etc.) to a user presenting one or more options for changing a mode of operation of one or more sensors, one or more modules, one or more devices, and the like that may be associated with various devices and/or systems, for example, in a vehicle.

In one embodiment, the system 100 may cause, at least in part, a monitoring of a current location of the device on the route based, at least in part, on a direction and a distance traveled by the device. In one embodiment, the navigation module 119 may utilize one or more sensors and/or modules (e.g., a magnetometer) associated with the navigation module 119 and/or a host device to determine a direction and a distance of travel for presenting a current location of a device (e.g., a vehicle) via a UI. For example, the navigation module 119 can use the travel direction information to determine whether the device is at least traveling in the direction of a checkpoint and/or a destination point on a determined route.

In one embodiment, the system 100 may cause, at least in part, a presentation of the current navigation location. In one embodiment, the navigation module 119 may determine and present a current position of a host device (e.g., a vehicle) and cause a presentation of the current location and/or traveling direction on a map application, wherein the current location and traveling direction may be determined based on information determined substantially locally.

In one embodiment, the system 100 may determine a potential deviation of the device from the route based, at least in part, on the direction, a duration of travel, or a combination thereof. For example, the navigation module 119 may utilize information from various local sensors to determine if a vehicle is still traveling on a route initially determined. In one example, the navigation module 119 may estimate a duration of time that should take for a vehicle to travel a determined distance on the determined route. For example, if the vehicle travels at 60 mph (e.g., one mile-per-minute), then in five minutes, it should reach a checkpoint location located at 5 miles from an initial location on a determined route. However, if the vehicle speed is determined to be substantially below what should or could be along the determined route, then there may be a potential deviation from the determined route. In one example, a deviation may also be indicated by a low or no movement indicated by an odometer sensor.

In one embodiment, the system 100 may cause, at least in part, an initiation of the active mode of operation for the at least one location sensor to update the current location. In one embodiment, if the navigation module 119 determines a potential deviation of the device from the route, then one or more sensors which may be in a sleep mode of operation may be activated so that one or more location information may be requested and/or acquired from an external source for updating current location and navigation information.

Although various embodiments are discussed with respect to providing efficient power saving schemes for a device and any associated sensors thereon while allowing for various levels of functionalities, it is contemplated that embodiments of the approach described herein are applicable to any type of sensory data including environmental, physical properties, material, location sensors, user device, and the like. In one embodiment, the sensory data refers, for instance, to data that indicates state of a sensor or an instrument, state of a user device, a vehicle, or user environment and/or the inferred state of the sensor or the instrument, of the user device, of the vehicle, or of the user.

By way of example, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs can support any type of interface to the user (such as "wearable" circuitry, etc.). Further, the UEs 101 may include various sensors for collecting data associated with a vehicle, a user, a user's environment, and/or with a UE 101, for example, the sensors may determine and/or capture audio, video, images, atmospheric conditions, device location, user mood, ambient lighting, user physiological information, device movement speed and direction, and the like.

By way of example, the UEs 101, the service provider 105, the content providers 107, and the instruments 109 may communicate with each other and other components of the communication network 115 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, one or more entities of the system 100 may interact according to a client-server model with the applications 103 and/or the DC module 117 of the UE 101. According to the client-server model, a client process sends a message including a request to a server process, and the server process responds by providing a service (e.g., context-based grouping, social networking, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
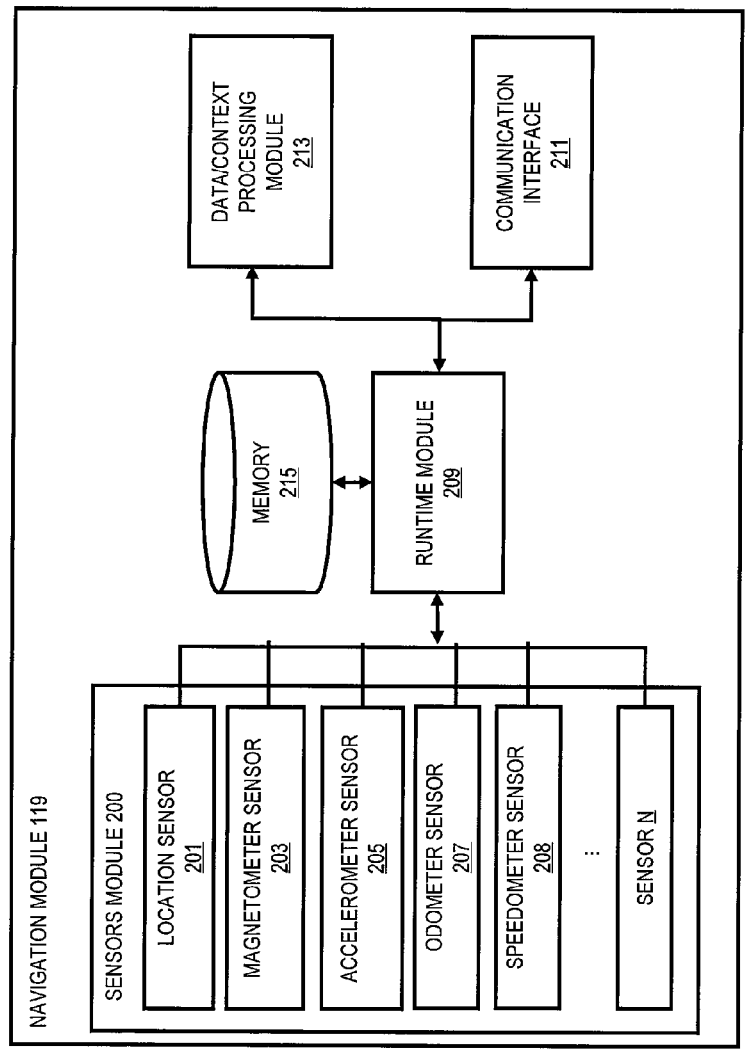
FIG. 2 is a diagram of the components of a navigation module capable of determining and presenting navigational information associated with a device, according to various embodiments.

FIG. 2 is a diagram of the components of a navigation module capable of determining and presenting navigational information associated with a device, according to various embodiments. By way of example, the navigation module 119 includes one or more components for receiving, collecting, generating, determining, and/or analyzing navigational data associated with various sensors and/or instruments of a vehicle. It is contemplated that the functions of these components may be combined in one or more components or performed by other components of equivalent functionality. In this embodiment, the navigation module 119 includes sensors module 200 that may include one or more sensors, for example, a location sensor 201, a magnetometer sensor 203, an accelerometer sensor 205, an odometer sensor 207, a speedometer sensor 208, and/or one or more other sensors N. Further, the navigation module 119 may also include a runtime module 209 to coordinate the use of other components of the navigation module 119, for example, a communication interface 211, a data/context processing module 213, and memory 215. The navigation module 119 may include various applications, software, and/or algorithms, which may be executed on the runtime module 209, and/or the navigation module 119, may utilize resources of a host device, for example, a UE 101, a navigation device 111, a vehicle's onboard electronics system, and/or other components of the system 100.

The location sensor 201 can determine a device's location, for example, location of a UE 101. The device's location may be determined by a triangulation system such as a satellite-based positioning system (e.g., GPS, GLONASS, etc.), a network assisted positioning system (e.g., A-GPS), Cell of Origin, or other location extrapolation technologies. Standard GPS, GLONASS, and A-GPS systems can use satellites 113 to pinpoint the location of a device. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location sensor 201 may also utilize multiple technologies to detect the location of the UE 101. Location coordinates (e.g., satellite-based positioning coordinates) can give finer detail as to the location of the UE 101 when media is captured. In one embodiment, satellite-based positioning coordinates are stored as context information in the memory 215 and are available to the navigation module 119, the service provider 105, and/or to other entities of the system 100 via the communication interface 211. Moreover, in certain embodiments, the satellite-based positioning coordinates can include an altitude to provide a height. In other embodiments, the altitude can be determined using another type of altimeter. In certain embodiments, the location sensor 201 can be a means for determining a location of the UE 101, an image, or used to associate an object in view with a location.

The magnetometer sensor 203 can be used in finding horizontal orientation of a device. A magnetometer is an instrument that can measure the strength and/or direction of a magnetic field. Using the same approach as a compass, the magnetometer is capable of determining the direction of a device using the magnetic field of the Earth. The front of a media capture device (e.g., a camera) can be marked as a reference point in determining direction. Thus, if the magnetic field points north compared to the reference point, the angle the device (e.g., a UE 101, a vehicle, a navigation device, etc.) reference point is from the magnetic field is known. Simple calculations can be made to determine the direction of the device associated with the magnetometer. In one embodiment, horizontal directional data obtained from a magnetometer can be stored in memory 215, made available to other sensors, modules, and/or applications, for example, at the UE 101, at the navigation device 111, and/or transmitted via the communication interface 211 to one or more entities of the system 100.

The accelerometer sensor 205 can be used to determine vertical orientation of a device. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer sensor 205 can determine the angle the UE 101 is pointed as compared to Earth's gravity. In certain embodiments, the magnetometer sensor 203 and accelerometer sensor 205 can be means for ascertaining a perspective of a user. This perspective information may be stored in the memory 215, made available to other modules and/or applications at the UE 101, at the navigation device 111, and/or sent to one or more entities of the system 100.

The odometer sensor 207 can be used to determine a distance traveled, for example, by a vehicle. In one embodiment, the odometer sensor 207 may request and odometer information from a vehicle's odometer sensor and/or instrument, wherein the information may be actual odometer readings and/or may be such data that the navigation module 119 may process for determining odometer information of the vehicle. In one embodiment, distance traveled by a user may be determined from a pedometer device utilized by the user.

The speedometer sensor 208 can be used to determine a speed at which a vehicle (or person) may be travelling at, wherein the speed may be present in different distance and time measuring units. For example, a speed of a vehicle may be presented in miles-per-hour (mph), miles-per-minute, kilometer-per-hour (km/h), meters-per-second, and the like. In one embodiment, speed information may be determined by utilizing odometer information associated with a vehicle or a user to determine a distance traveled in a given amount of time. For example, an odometer reading indicates a distance of one-mile that was traveled in one minute, which would indicate a speed of one-mph or 60-mph. Conversely, a distance traveled may be determined from available information from a speedometer sensor and a duration of time that a vehicle or a user traveled at that speed. For example, if speedometer information indicates a speed of 100 km/h and a vehicle traveled for 30 minutes at that speed, then the distance traveled by the vehicle would be 50 km (100 km/h×0.5 hrs.) In one embodiment, one or more variations in speed of a vehicle may be tracked and correlated to a duration of time that the vehicle traveled at a specific speed. For example, a vehicle travels at 100 km/h for 15 minutes (resulting in a distance of 25 km) and then travels at 90 km/h for 10 minutes (resulting in a distance of 15 km), wherein the total distance traveled would be 40 km during the 25-minute travel. Moreover, a given speed information for a given duration of time at the speed may be utilized to instantly and/or continuously calculate a traveled distance, for example, feet-per-seconds, meters-per-seconds, and the like.

In various embodiments, the one or more other sensors N may include various sensors for detecting and/or capturing data associated with the user and/or a host device. For example, various sensors N may include sensors for capturing environmental (e.g., atmospheric) conditions, audio, video, images, temperature, user physiological data, user mood (e.g., hungry, angry, tired, etc.), user interactions with the UEs 101, with the navigation device 111, and the like. In certain embodiments, information collected from and/or by the navigation module 119 may be retrieved by the runtime module 209, stored in memory 215, made available to other, sensors, modules, and/or applications at the UE 101, at the navigation device 111, and/or sent to one or more entities of the system 100.

In one embodiment, the communication interface 211 can be used to communicate with a host device, a host system, and/or one or more entities of the system 100. Certain communications can be via methods such as an internet protocol, messaging (e.g., SMS, MMS, etc.), or any other communication method (e.g., via the communication network 115). In some examples, the navigation module 119 may send and/or receive various sensor data to and from other sensors, other modules, other devices, and the like, for example, to and/or from a UE 101, the navigation device 111, the service providers 105, the content providers 107, and/or to other entities of the system 100.

The data/context processing module 213 may be utilized in determining context information from the sensors module 200, the UE 101, the navigation device 111. For example, it can determine user activity, vehicle type, in-vehicle available instruments, application and/or service utilization, user information, type of information included in the data, information that may be inferred from the data, and the like. The data may be shared with a host device (e.g., the UE 101 applications 103), and/or caused to be transmitted, via the communication interface 211, to the service provider 105 and/or to other entities of the system 100. The data/context processing module 213 may additionally be utilized as a means for determining information related to the user, a vehicle, instruments, sensors, gauges, various data, the UEs 101, and the like. Further, data/context processing module 213, for instance, may manage (e.g., organizes) the collected data based on general characteristics, rules, logic, algorithms, instructions, etc. associated with the data. In certain embodiments, the data/context processing module 213 can infer higher level context information from the context data such as favorite locations, significant places, common activities, interests in products and services, etc.

In one embodiment, the sensors module 200 may determine and/or set an operation mode of one or more sensors based, at least in part, on one or more parameters, configurations, requirements, settings, and the like, which may be provided by a host device, a service provider, and/or a user. In one user case scenario, the navigation module 119 may be implemented in a navigation device 111, wherein a power management setting may indicate that one or more of the sensors of the navigation module may need to be put into a sleep mode, a suspend mode, an active mode, a hybrid mode, and the like. In one embodiment, a user may determine and select a mode of operation for the one or more sensors in the sensors module 200.

Figure 3:
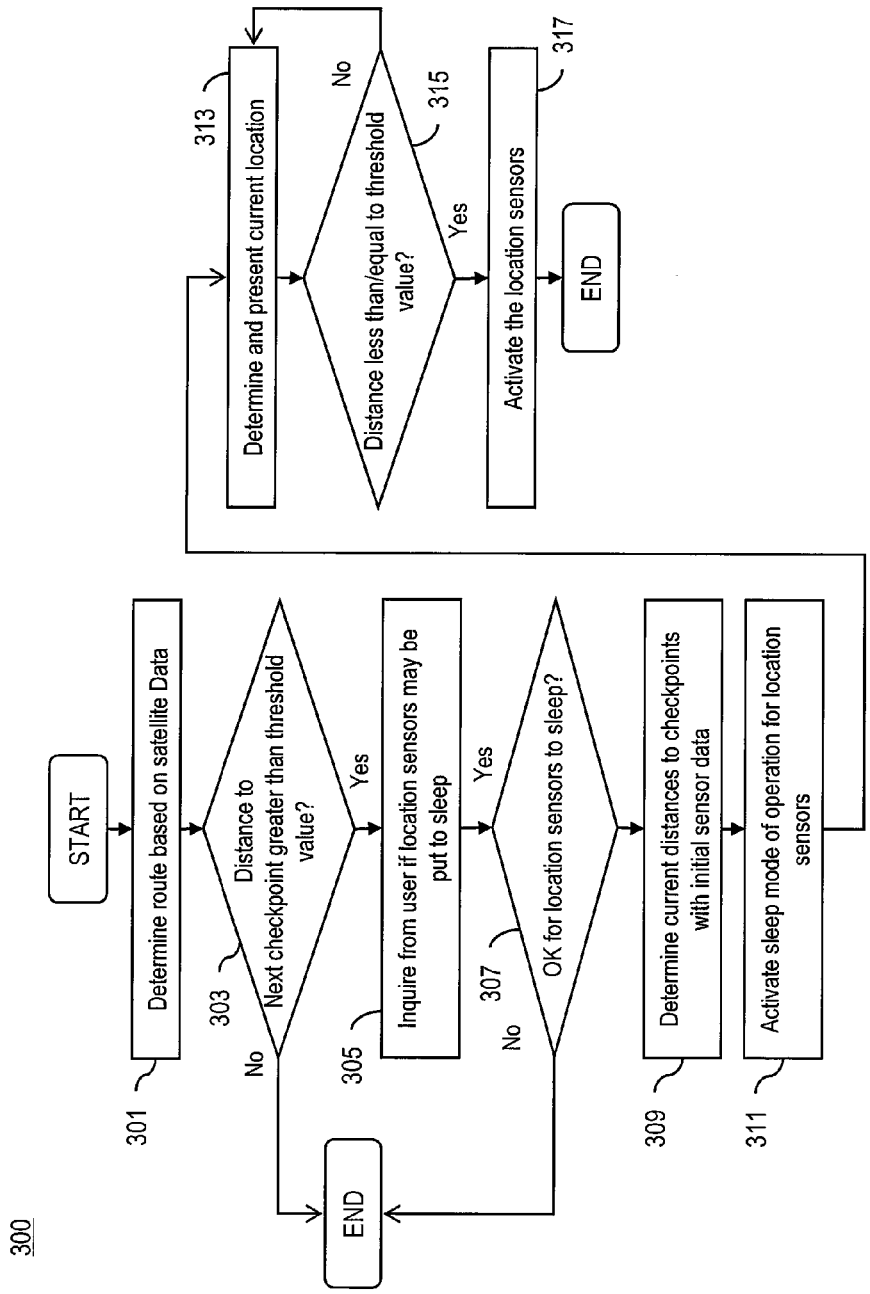
FIG. 3 illustrates an example flowchart for utilizing positioning information to determine a route via various local and external sensors, according to various embodiments.

FIG. 3 illustrates an example flowchart for utilizing positioning information to determine a route via various local and external sensors, according to various embodiments.

In one use case scenario, a user wishes to determine a route from a current location of the user (initial, starting) to a destination point by utilizing a navigation device. For example, the navigation device may be a standalone device, may be integrated into a user device, e.g., a mobile device, or may be integrated into a vehicle's instrumentation system. In one embodiment, the process 300 begins at step 301 where the navigation device determines a route from the starting point to the destination point by utilizing mapping data and positioning data from local and external sources (e.g., satellite-based positioning data, network-assisted positioning data, etc.). Further, the navigation device may determine any potential deviation points (checkpoints) along the route where the user may change course of travel, for example, take an exit off a freeway, or make right/left onto another road, and the like. In one embodiment, the navigation device may utilize the available positioning data to determine a distance from the starting point to one or more checkpoints and to the destination point. In this use case scenario, there is only one checkpoint, point A. In step 303, the navigation device may compare the distance between the starting point and the checkpoint A to a predetermined threshold distance value. If the distance is not greater than the threshold value, then the process 300 ends, but if the distance is equal/greater than the threshold value, then the process continues to step 305 where the navigation device prompts the user if one or more navigation and/or location sensors associated with the navigation device may be put into a sleep mode of operation, for example, to save power. In step 307 if the user does not agree, then the process 300 ends, otherwise the process continue to step 309 where the navigation device utilizes currently available external and local positioning data to determine current location and one or more distances to the checkpoint A and the destination point. In step 311, the navigation device causes activation of a sleep mode of operation for one or more location sensors, for example, a satellite transceiver. In step 313, the navigation device utilizes one or more sensors to interface with one or more sensors and/or instruments of the vehicle for determining odometer data, speedometer data, and the like, which may be utilized to determine the distance being traveled by the vehicle and/or determine the location of the vehicle at any given time along the route. At this point, the navigation device is utilizing the data from the vehicle to determine a current location instead of utilizing positioning data from an external source (e.g., GPS.) Further, the navigation device may continuously or periodically determine the distance between a current location of the vehicle and the checkpoint A for comparing to the threshold value and if, at step 315, the comparison shows to be less than/equal to the threshold value, then at step 317 the one or more location sensors that were in a sleep mode of operation are put into an active mode of operation so that the navigation device may communicate with external sources (e.g., GPS) for obtaining current real-time positioning data.

Figure 4:
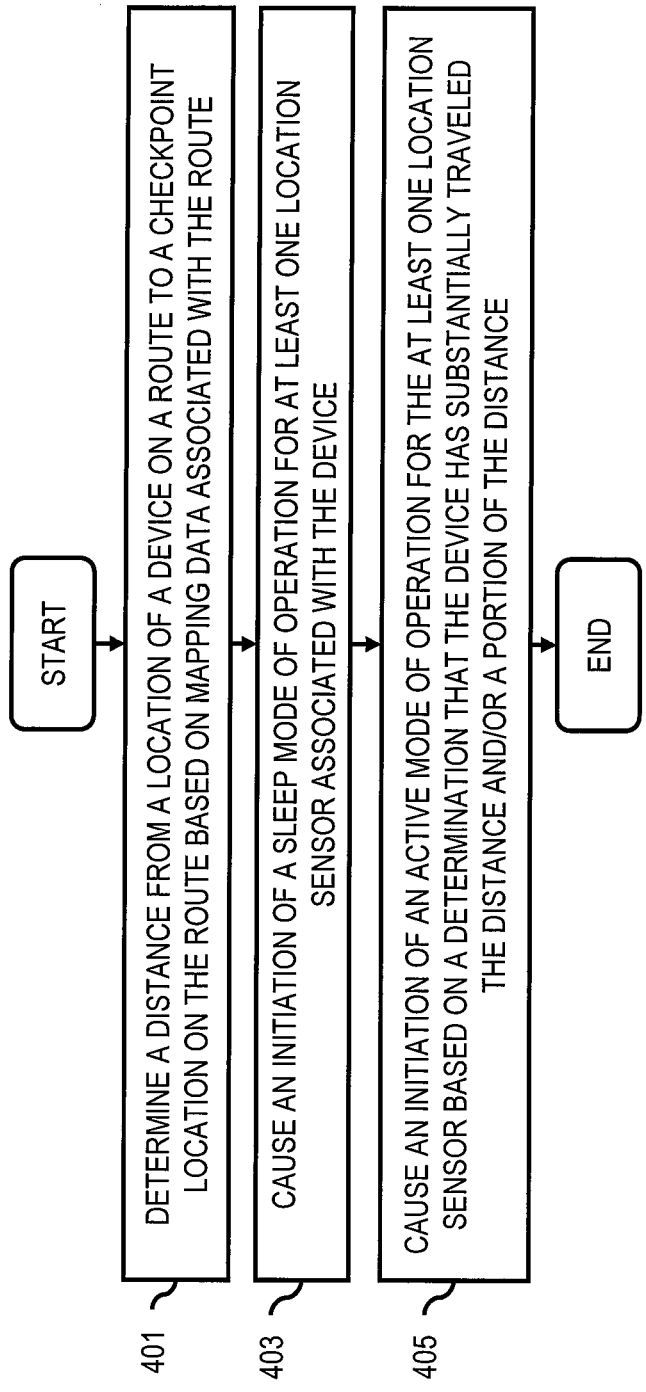
FIGS. 4 and 5 illustrate flowcharts of various processes for, at least, providing efficient power saving schemes for a device and any associated sensors thereon while allowing for various levels of functionalities, according to various embodiments.
Figure 5:
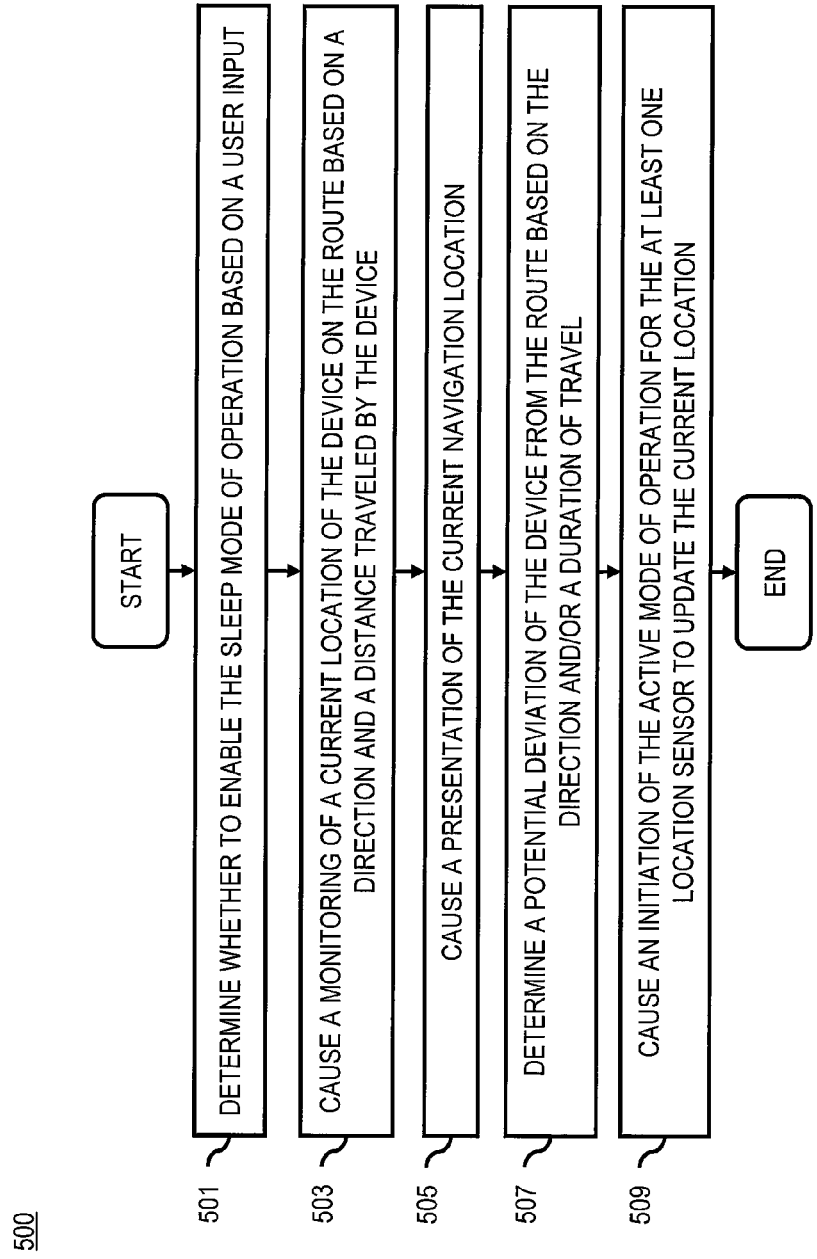
Figure 9:
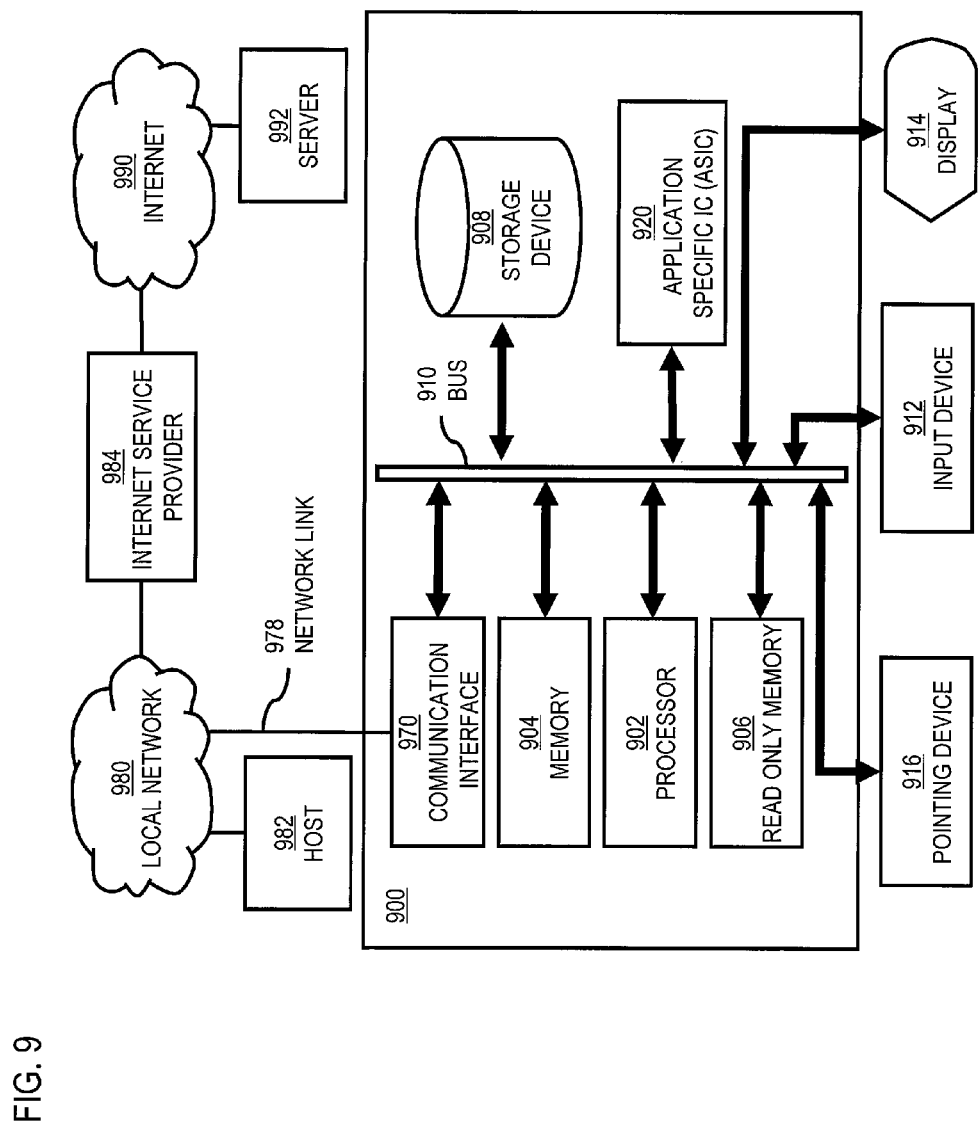
FIG. 9 is a diagram of hardware that can be used to implement an embodiment of the invention.

FIGS. 4 and 5 illustrate flowcharts of various processes for, at least, providing efficient power saving schemes for a device and any associated sensors thereon while allowing for various levels of functionalities, according to various embodiments. In various embodiments, the navigation module 119, the applications 103, the DC module 117, and/or the navigation device 111 may perform processes 400 and 500 that may be implemented in, for instance, a chip set including a processor and a memory as shown in FIG. 9. As such, the applications 103, the navigation module 119 can provide means for accomplishing various parts of the process 400 and 500 as well as means for accomplishing other processes in conjunction with other components of the system 100. Throughout these processes, the applications 103, the DC module 117, and/or the navigation module 119 may be referred to as completing various portions of the processes 400 and 500, however, it is understood that other components of the system 100 can perform some of and/or all of the process steps. Further, in various embodiments, navigation module 119 may be implemented in one or more entities of the system 100.

Referring to FIG. 4, the process 400 begins at step 401 where the navigation module 119 determines a distance from a location of a device on a route to a checkpoint location on the route based, at least in part, on mapping data associated with the route. In one use case scenario, a user may indicate, via a navigation device (e.g., a UE 101, the navigation device 111, etc.), on a map application a desired destination location, wherein the navigation module 119 may determine one or more possible routes to the destination based on mapping data. In one embodiment, the mapping data is available on the device, via one or more service providers, via one or more content providers, or a combination thereof. Further, once the user and/or the navigation module 119 select a route, the navigation module 119 may determine various information available for the selected route. For example, a distance from the user's current location to the destination may be determined, a travel time, or a distance from the user's current location to one or more checkpoint locations along the route may be determined, or one or more distances between the one or more checkpoint locations may be determined, and the like. In one embodiment, a checkpoint location may be a point along the route where the user may be able to take one or more actions, for example, take an exit off a freeway, or make a right/left turn onto another road, or make a U-turn, and the like. In one embodiment, there may be one or more sub-destinations identified by the user, wherein a sub-destination may be planned stop for the user. For example, a stop at a market location when traveling from a workplace to home.

In step 403, the navigation module 119 causes, at least in part, an initiation of a sleep mode of operation for at least one location sensor associated with the device. In one embodiment, the location sensor includes, at least in part, a satellite-based navigation system, a network-assisted navigation system, or a combination thereof. For example, the location sensors may include one or more transceivers for communication with one or more satellite-based positioning systems (e.g., GPS, GLONASS, etc.), one or more network-assisted positioning systems, and the like. In various embodiments, the navigation module 119 and/or a host device of the navigation module 119 may determine that it is possible and/or beneficial to put into a sleep mode of operation one or more sensors associated with the navigation module 119 and/or the host device while still capable of providing one or more desired functionalities (e.g., navigation). In various embodiments, the initiation of the sleep mode of operation is based, at least in part, on a power level associated with the device, a configuration of the device, etc., wherein the sleep mode of operation may be for an improved energy efficiency and power savings. In one embodiment, the initiation of the sleep mode of operation is based, at least in part, on a determination that the distance is greater than a predetermined threshold value, wherein the threshold value may be a determined minimum distance before reaching a next checkpoint location, for example, two miles before reaching the next checkpoint location.

In step 405, the navigation module 119 causes, at least in part, an initiation of an active mode of operation for the at least one location sensor based, at least one in part, on a determination that the device has substantially traveled the distance, a portion of the distance, or a combination thereof. In one embodiment, the navigation module 119 may compare a determined traveled distance to a predetermined threshold value for determining whether to initiate active mode of operation for one or more sensors associated with the navigation module 119 and/or a host device. In one embodiment, the traveled distance may be presented on a map application via a UI on a device, wherein the traveled distance may be continuously determined and presented. In one embodiment, the navigation module 119 may utilize, at least in part, odometer data, e.g., of a vehicle, in determining that the device (e.g., the vehicle) has substantially traveled the distance and/or a portion of the distance from a starting point location and/or a prior checkpoint location to a next checkpoint location or a final destination location. For example, the odometer data may be obtained via a wireless and/or a wired interface with an odometer sensor and/or an odometer instrument associated with the vehicle. In one embodiment, the determination that the device has substantially traveled the distance, a portion of the distance, or a combination thereof is based, at least in part, on speedometer data and a duration of travel. For example, a given speed of a vehicle for a given travel duration may be utilized to determine a traveled distance during the given travel duration. For example, the speedometer data may be obtained via a wireless and/or a wired interface with a speedometer sensor and/or a speedometer instrument associated with the vehicle. In one embodiment, a current speed of a vehicle may be utilized to estimate if a distance threshold value may need to be reconsidered/recalculated so that there is sufficient time for activating the one or more sensors which may be in a sleep mode of operation. In one instance, activation of the one or more sensors may require a certain amount of time, for example one minute, wherein the threshold value for activating the one or more sensors is set at a distance of one mile before a checkpoint location. However, if a vehicle is traveling at a high rate of speed, for example more than 60 mph (e.g., more than one mile-per-min), then the vehicle will reach and pass the threshold value, which may reduce the time available to activate the one or more sensors for requesting and acquiring real-time location information from an external source. In one embodiment, one or more sensors may be activated before reaching a threshold value if it is determined that a device (e.g., a vehicle) may reach the threshold value before the one or more sensors are activated.

Referring to FIG. 5 now, the process 500 begins at step 501 where the navigation module 119 determines whether to enable the sleep mode of operation based, at least in part, on a user input. In one embodiment, a UE 101 and/or a navigation device 111 may present a UI (e.g., display, audio, etc.) to a user presenting one or more options for changing a mode of operation of one or more sensors, one or more modules, one or more devices, and the like that may be associated with various devices and/or systems, for example, in a vehicle.

In step 503, the navigation module 119 causes, at least in part, a monitoring of a current location of the device on the route based, at least in part, on a direction and a distance traveled by the device. In one embodiment, the navigation module 119 may utilize one or more sensors and/or modules (e.g., a magnetometer) associated with the navigation module 119 and/or a host device to determine a direction and a distance of travel for presenting a current location of a device (e.g., a vehicle) via a UI. For example, the navigation module 119 can use the travel direction information to determine whether the device is at least traveling in the direction of a checkpoint and/or a destination point on a determined route.

In step 505, the navigation module 119 causes, at least in part, a presentation of the current navigation location. In one embodiment, the navigation module 119 may determine and present a current position of a host device (e.g., a vehicle) and cause a presentation of the current location and/or traveling direction on a map application, wherein the current location and traveling direction may be determined based on information determined substantially locally.

In step 507, the navigation module 119 determines a potential deviation of the device from the route based, at least in part, on the direction, a duration of travel, or a combination thereof. For example, the navigation module 119 may utilize information from various local sensors to determine if a vehicle is still traveling on a route initially determined. In one example, the navigation module 119 may estimate a duration of time that should take for a vehicle to travel a determined distance on the determined route. For example, if the vehicle travels at 60 mph (e.g., one mile-per-minute), then in five minutes, it should reach a checkpoint location located at 5 miles from an initial location on a determined route. However, if the vehicle speed is determined to be substantially below what should or could be along the determined route, then there may be a potential deviation from the determined route. In one example, a deviation may also be indicated by a low or no movement indicated by an odometer sensor.

In step 509, the navigation module 119 causes, at least in part, an initiation of the active mode of operation for the at least one location sensor to update the current location. In one embodiment, if the navigation module 119 determines a potential deviation of the device from the route, then one or more sensors which may be in a sleep mode of operation may be activated so that one or more location information may be requested and/or acquired from an external source for updating current location and navigation information.

Figure 6:
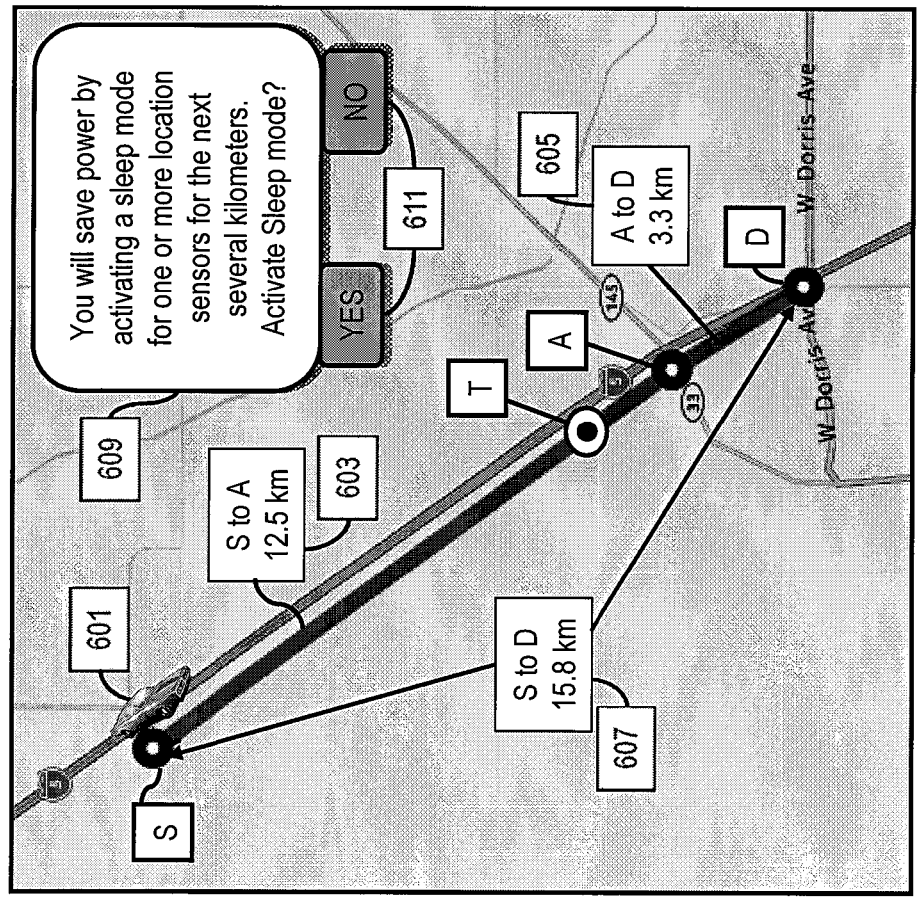
FIG. 6 illustrates a segment of a map application including navigation route information based on external positioning data, according to an embodiment.

FIG. 6 illustrates a segment of a map application including navigation route information based on external positioning data, according to an embodiment. FIG. 6 shows a map segment 600 which includes a navigation route from a starting location point S of a device/user 601 to a destination location point D. In one embodiment, a navigation device may determine that between the location points S and D, there may be one or more points, for example checkpoint location A, where a user may deviate from the determined route (e.g., exit the freeway). In one embodiment, the navigation device may use real-time external positioning data (e.g., GPS) to determine and present the distance between the location points S and A (e.g., 12.5 km) as shown at indicator 603, and between the location points A and D (e.g., 3.3 km) as shown at indicator 605, and between the locations points S and D (e.g., 15.8 km) as shown at indicator 607. In one embodiment, the navigation device may determine a threshold point T, where the one or more location sensors are to be reactivated so that if the user deviates from the determined route (e.g., exits the freeway at checkpoint A), external real-time positioning data may be utilized to detect the deviation and update the location information accordingly. In one embodiment, the navigation device may cause a presentation of a UI to a user including a message 609 and one or more selection options 611.

Figure 7:
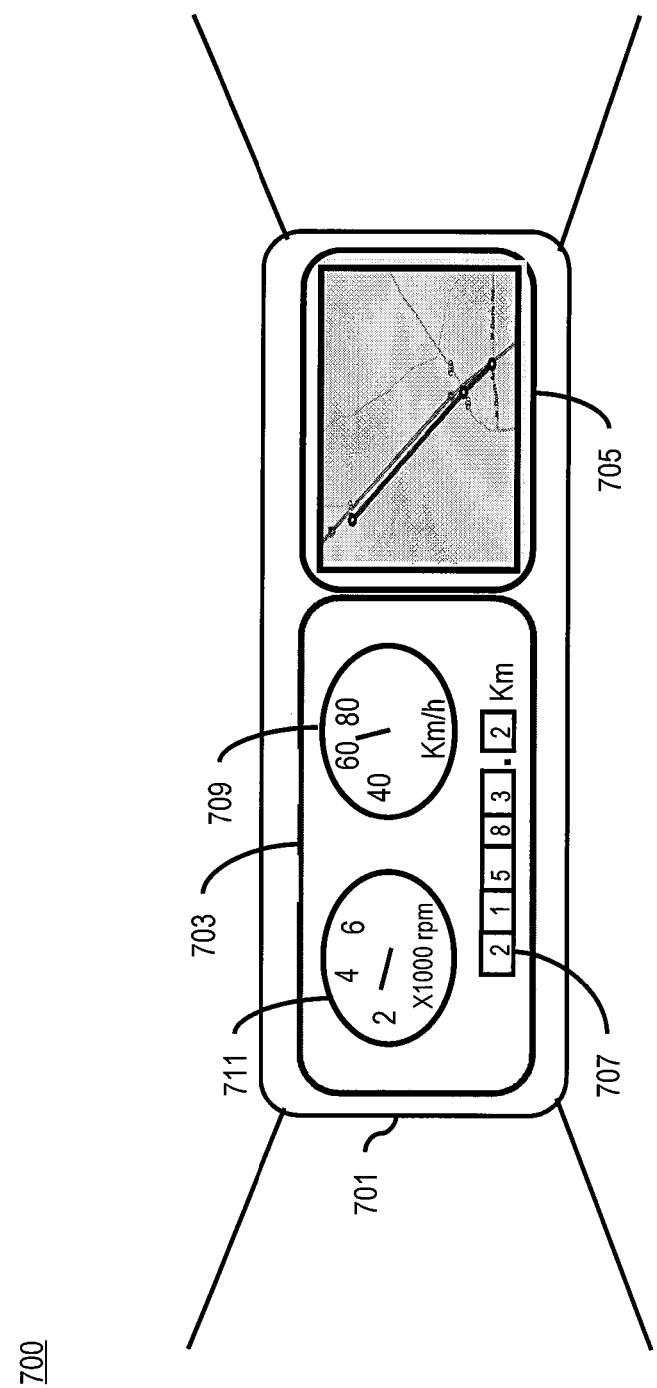
FIG. 7 includes a diagram showing instrumentation and navigation information associated with a vehicle, according to an embodiment.

FIG. 7 includes a diagram showing instrumentation and navigation information associated with a vehicle, according to an embodiment. Diagram 700 shows an instrument panel 701 which includes instruments/gauges 703 and a navigation device 705. The navigation device may utilize one or more location sensors for obtaining external positioning data from one or more service providers and/or the navigation device 705 may communicate with an odometer device 707, a speedometer 709, a tachometer 711, and the like for determining and utilizing in calculation of a device (e.g., vehicle) location.

Figure 8:
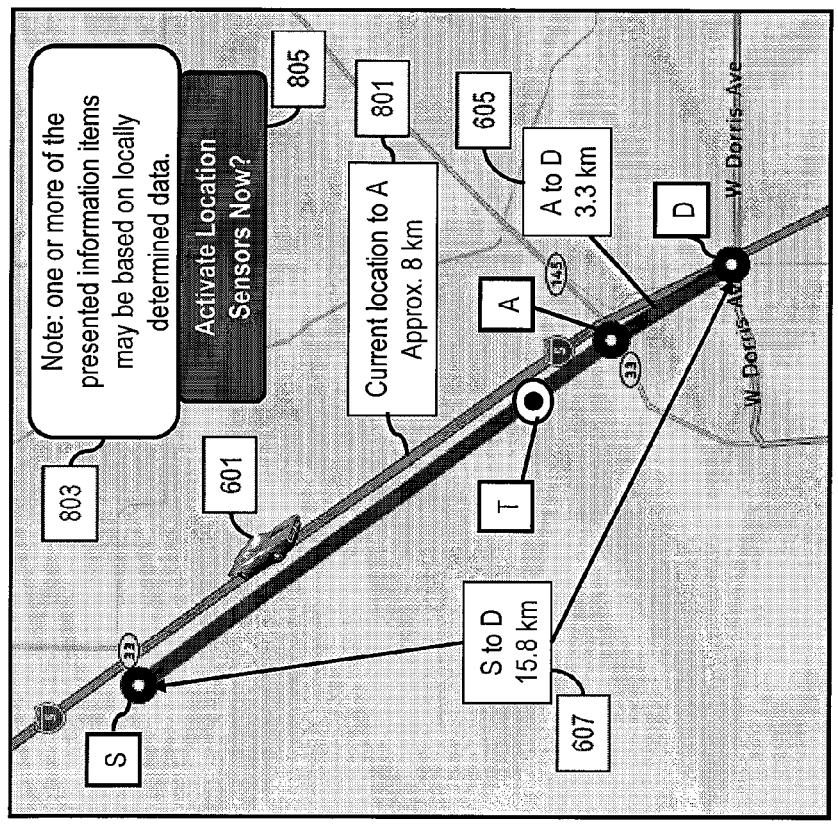
FIG. 8 illustrates a segment of a map application including navigation route information based on local positioning data, according to an embodiment.

FIG. 8 illustrates a segment of a map application including navigation route information based on local positioning data, according to an embodiment. In one embodiment, the navigation device may continuously determine the location of the device 601 and calculate (e.g., estimate, approximate, etc.) a distance 801 (e.g., approximately 8 km) to the checkpoint A. In one embodiment, the navigation device at 803 may indicate to the user that "one or more of the presented information items may be based on locally determined data," wherein the navigation device may prompt the user in 805 whether the user wishes to "activate the location sensors now?" for more accurate location data once real-time positioning data is acquired from one or more external sources.

The processes described herein for providing efficient power saving schemes for a device and any associated sensors thereon while allowing for various levels of functionalities may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide efficient power saving schemes for a device and any associated sensors thereon while allowing for various levels of functionalities as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing efficient power saving schemes for a device and any associated sensors thereon while allowing for various levels of functionalities.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing efficient power saving schemes for a device and any associated sensors thereon while allowing for various levels of functionalities. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for providing efficient power saving schemes for a device and any associated sensors thereon while allowing for various levels of functionalities. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing efficient power saving schemes for a device and any associated sensors thereon while allowing for various levels of functionalities, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 115 for providing efficient power saving schemes for a device and any associated sensors thereon while allowing for various levels of functionalities.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
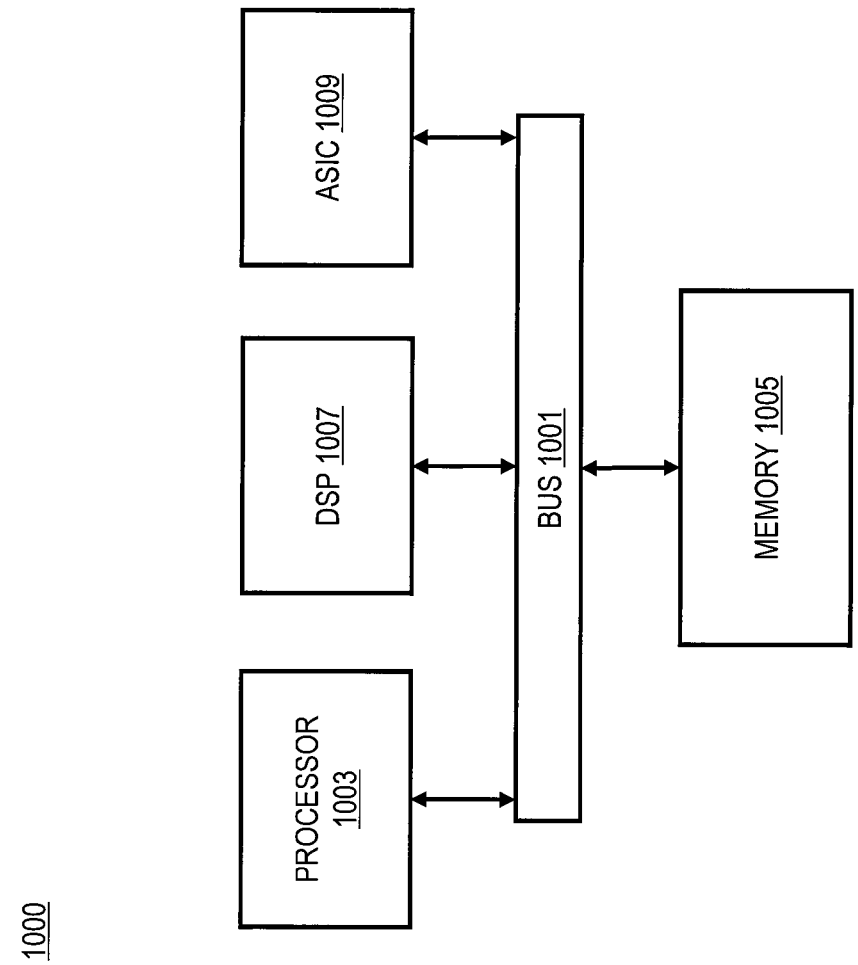
FIG. 10 is a diagram of a chip set that can be used to implement an embodiment of the invention.

FIG. 10 illustrates a chip set or chip 1000 upon which an embodiment of the invention may be implemented. Chip set 1000 is programmed to provide efficient power saving schemes for a device and any associated sensors thereon while allowing for various levels of functionalities as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing efficient power saving schemes for a device and any associated sensors thereon while allowing for various levels of functionalities.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to providing efficient power saving schemes for a device and any associated sensors thereon while allowing for various levels of functionalities. The memory 1005 also stores the data associated with or generated by the execution of the inventive steps.

Figure 11:
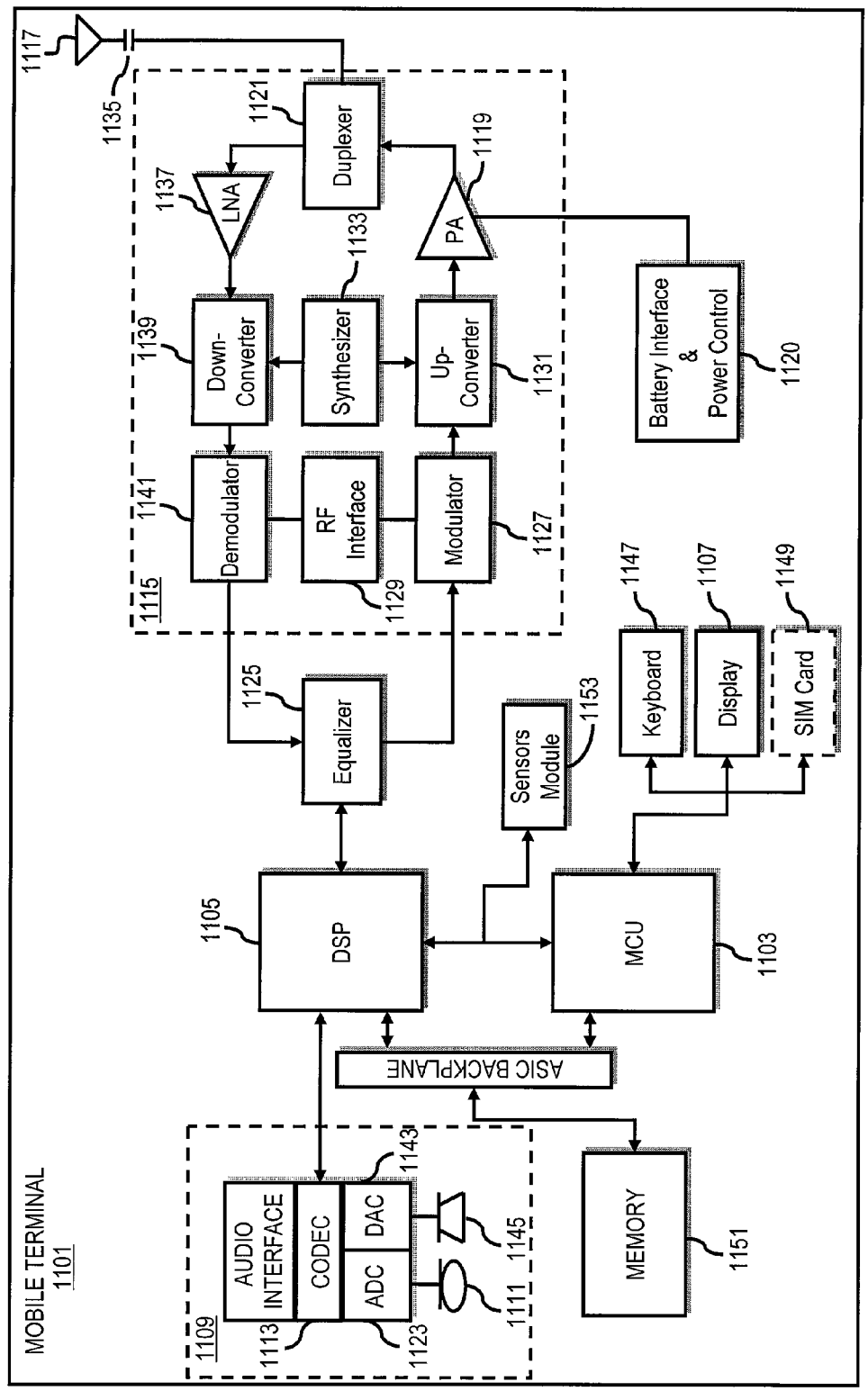
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of providing efficient power saving schemes for a device and any associated sensors thereon while allowing for various levels of functionalities. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing efficient power saving schemes for a device and any associated sensors thereon while allowing for various levels of functionalities. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide efficient power saving schemes for a device and any associated sensors thereon while allowing for various levels of functionalities. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Additionally, sensors module 1153 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1101 (e.g., a mobile phone), a user of the mobile terminal 1101, an environment of the mobile terminal 1101 and/or the user, or a combination thereof, wherein the data may be collected, processed, stored, and/or shared with one or more components and/or modules of the mobile terminal 1101 and/or with one or more entities external to the mobile terminal 1101.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining a distance from a location of a device to a location of a checkpoint, the device travelling along a route, the determining of the distance based, at least, on mapping data associated with the route;
    causing an initiation of a sleep mode of operation for at least one location sensor associated with the device;
    determining a likelihood that the device has deviated from the route; and
    causing an initiation of an active mode of operation for the at least one location sensor, the causing of the initiation of the active mode of operation based, at least, on the determining of the likelihood that the device has deviated from the route.

2. The method of claim 1, wherein the causing of the initiation of the sleep mode of operation is based at least on a determination that the distance is greater than a predetermined threshold value.

3. The method of claim 1, further comprising:
    determining whether to enable the sleep mode of operation based at least on a user input.

4. The method of claim 1, wherein the causing of the initiation of the sleep mode of operation is based at least on a power level associated with the device, a configuration of the device, or a combination thereof.

5. The method of claim 1, wherein the determining of the likelihood that the device has deviated from the route is based at least on odometer data.

6. The method of claim 1, wherein the determining of the likelihood that the device has deviated from the route is based at least on speedometer data and a duration of travel.

7. The method of claim 1, wherein the location sensor includes a satellite-based navigation system, a network-assisted navigation system, or a combination thereof.

8. The method of claim 1, further comprising:
    causing a monitoring of a current location of the device on the route based at least on a direction and a distance traveled by the device.

9. The method of claim 8,
    wherein the determining of the likelihood that the device has deviated from the route is based at least on the direction of travel, a duration of travel, or a combination thereof; and the method further comprising:
    updating the current location in response to the initiation of the active mode of operation for the at least one location sensor.

10. The method of claim 1, wherein the mapping data is available on the device, via one or more service providers, via one or more content providers, or a combination thereof.

11. The method of claim 1, wherein the determining of the likelihood that the device has deviated from the route is based at least on a motion of the device and/or a duration of travel of the device.

12. An apparatus comprising:
    at least one processor; and
    at least one memory including computer program code for one or more programs,
    the at least one memory and the computer program code configured to, with the at least one processor, cause the apparatus to perform at least the following;
        determine a distance from a location of a device to a location of a checkpoint, the device travelling along a route, the determining of the distance based, at least, on mapping data associated with the route;
        cause an initiation of a sleep mode of operation for at least one location sensor associated with the device;
        determine a likelihood that the device has deviated from the route; and
        cause an initiation of an active mode of operation for the at least one location sensor, the causing of the initiation of the active mode of operation based, at least in part, on the determining of the likelihood that the device has deviated from the route.

13. The apparatus of claim 12, wherein the initiation of the sleep mode of operation is based at least on a determination that the distance is greater than a predetermined threshold value.

14. The apparatus of claim 12, wherein the apparatus is further caused to:
    determine whether to enable the sleep mode of operation based at least on a user input.

15. The apparatus of claim 12, wherein the initiation of the sleep mode of operation is based, at least, on a power level associated with the device, a configuration of the device, or a combination thereof.

16. The apparatus of claim 12, wherein the determining of a likelihood that the device has deviated from the route is based at least on odometer data.

17. The apparatus of claim 12, wherein the determining of a likelihood that the device has deviated from the route is based at least on speedometer data and a duration of travel.

18. The apparatus of claim 12, wherein the location sensor includes, at least, a satellite-based navigation system, a network-assisted navigation system, or a combination thereof.

19. The apparatus of claim 12, wherein the apparatus is further caused to:
    cause a monitoring of a current location of the device on the route based at least on a direction and a distance traveled by the device.

20. The apparatus of claim 19, wherein the determining of a likelihood that the device has deviated from the route is based at least on the direction of travel, a duration of travel, or a combination thereof; and wherein the apparatus is further configured to:

update the current location in response to the initiation of the active mode of operation for the at least one location sensor.

21. The apparatus of claim 12, wherein the likelihood that the device has deviated from the route is determined based at least on a motion of the device and/or a duration of travel of the device.

22. An apparatus comprising:
   at least one processor; and
   at least one memory including computer program code for one or more programs,
   the at least one memory and the computer program code configured to, with the at least one processor, cause the apparatus to perform at least the following,
   cause an initiation of a sleep mode of operation for at least one location sensor associated with the device;
   determine a likelihood that the device has deviated from a predetermined route; and
   cause an initiation of an active mode of operation for the at least one location sensor based, at least, on the determining of a likelihood that the device has deviated from the route.

23. The apparatus of claim 22, wherein the likelihood that the device has deviated from the route is determined based at least on mapping data associated with the route.

* * * * *